US006996279B2

(12) United States Patent
Van Der Vleuten

(10) Patent No.: US 6,996,279 B2
(45) Date of Patent: Feb. 7, 2006

(54) COMPRESSED STORAGE OF DATA ITEMS

(75) Inventor: Renatus Josephus Van Der Vleuten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/491,373

(22) PCT Filed: Oct. 1, 2002

(86) PCT No.: PCT/IB02/04055

§ 371 (c)(1),
(2), (4) Date: Mar. 31, 2004

(87) PCT Pub. No.: WO03/032644

PCT Pub. Date: Apr. 17, 2003

(65) Prior Publication Data

US 2004/0233702 A1    Nov. 25, 2004

(30) Foreign Application Priority Data

Oct. 5, 2001    (EP) ................................. 01203762

(51) Int. Cl.
   *G06K 9/36*    (2006.01)
   *G06K 9/46*    (2006.01)
(52) U.S. Cl. ...................... 382/232; 382/233; 382/244; 382/305; 382/306; 345/600; 345/686; 345/472; 358/426.05; 358/523; 358/524; 711/170; 711/171; 707/101; 708/203
(58) Field of Classification Search ................ 382/232, 382/233, 244, 305, 306; 345/600, 686, 472; 358/426.05, 523, 524; 711/170, 171; 707/101; 708/203
See application file for complete search history.

(56) References Cited

U.S. PATENT DOCUMENTS 6,128,413 A * 10/2000 Benamara .................... 382/251
6,615,335 B1 * 9/2003 Kleihorst et al. ........... 711/170
6,731,808 B2 * 5/2004 Van Der Vleuten et al. .......................... 382/232

FOREIGN PATENT DOCUMENTS

EP          0200890 A1    12/1986
WO          WO 0117268     3/2001

* cited by examiner

Primary Examiner—VanThu Nguyen

(57) ABSTRACT

Storing of data items in a memory (31) is provided wherein the data items are divided into successive data pieces of decreasing significance, and the data pieces are stored in respective parts of the memory (31), and when applying a data piece to the memory (31) in case all candidate memory parts are assigned to other data pieces: if the significance of the applied data piece is lower than a lowest significance of the other data pieces, discarding the applied data piece; if the significance of the applied data piece in one of the candidate memory parts at expense of a given other data piece which has a lower significance that the significance of the applied data piece, wherein the significance value of a data piece is based on a total or absolute distortion value of the data item. Advantageous use of the invention is made in applications using a device of fixed storage capacity for storing a flexible number of compressible data items, such as video, images, audio, speech.

11 Claims, 1 Drawing Sheet

COMPRESSED STORAGE OF DATA ITEMS

BACKGROUND OF THE INVENTION

1. Field of Invention

The invention relates to storing data items in a memory, to reading data items from a memory, and to a storage medium having stored thereon data items.

2. Description of the Prior Art

It is known to use a storage medium of fixed size to store multiple objects which may be subjected to non-reversible (lossy) compression. Such applications include digital still cameras, where images are stored on a flash card, floppy disc or hard-drive. Further, video cameras are known in which multiple recordings are stored on a hard-drive, optical disc or tape. Also known are storage devices such as embedded memories, where it is desirable to minimize the total storage capacity used while still retaining a best possible image quality. Sometimes, a limited number of settings is available to the user to change the trade-off between quality and capacity. For example, video can be recorded in either 'standard play' or 'long play' mode, or snapshots can be taken at either 'standard resolution' or 'high resolution'. Once a decision has been made to use a certain quality, the decision cannot be changed afterwards, even in those cases where ample storage capacity is still available.

Cormac Herley discloses in 6th International Conference on Image Processing (ICIP '99), vol. 3, Kobe, Japan, 24–28 Oct. 1999, storage of digital camera images. The camera is designed to store a fixed number of images, and a lossy rate controlled compression is used to ensure that each image fits in the space allocated to it.

SUMMARY OF THE INVENTION

An object of the invention is to provide improved storage of data items. To this end, the invention provides a method of and an arrangement for storing data items in a memory, and a storage medium as defined in the independent claims. Advantageous embodiments are defined in the dependent claims.

According to a first aspect of the invention, each data item is divided into successive data pieces of decreasing significance, the data pieces are stored in respective parts of the memory, and when applying a data piece to the memory in case all candidate memory parts are assigned to other data pieces, if the significance of the applied data piece is lower than a lowest significance of the other data pieces, the applied data piece is discarded; and if the significance of the applied data piece is higher than the lowest significance of the other data pieces, the applied data piece is stored in one of the candidate memory parts at expense of a given other data piece which as a lower significance than the significance of the applied data piece, wherein the significance of each data piece is based on a total or absolute distortion of the data item at that data piece. By taken into account total or absolute distortions, reduction of quality will always affect a data item having a (near) highest quality. The total or absolute distortion is a measure of the absolute quality of the data item; a low distortion indicates a high quality and vice versa.

The significance associated with a given data piece may be based on the total or absolute distortion of the data item up to and including said data piece. In this embodiment, the data item having currently the highest quality will be reduced in quality.

Advantageously, the significance associated with a given data piece may be based on the total or absolute distortion of the data item up to but not including said data piece. In this embodiment, the quality of the data item after the data piece has been removed is taken into account, resulting in a better guarantee that the minimum media item quality is maximized. In other words, in this embodiment, the data item which will have the highest quality after quality reduction will be reduced in quality.

In a preferred embodiment of the invention, a record is kept for each data piece, the record comprising the significance of the data piece and the data item to which the data piece belongs. The significance of each data piece represents the total distortion of the data item at that data piece. The record piece may be locally incorporated in a memory part, e.g. together with the data piece to which it belongs. Preferably, the record is kept in an auxiliary memory wherein each record further comprises a pointer which indicates a position in a main memory in which the data piece is stored.

Whenever a new data item is to be stored, it is preferably compressed by a scalable compression method in order to produce a scalable bit-stream. An advantageous method is described in WO01/17268-A1. Such a scalable compression method has the property that the resulting scalable bit-stream give a best possible reconstruction quality for the given data item, given the number of bits available. When the scalable bit-stream is not cut off, the data item is encoded (near) losslessly, i.e. at a quality such that the reproduction is perceptually indistinguishable from the original. Scalable coding mechanisms are known for video and audio. In a preferred embodiment, the scalable bit-stream is cut into data pieces of the same sizes as the memory parts. Next, for each of these data pieces, a significance is calculated. Preferably, the significance is calculated as a distortion value, which indicates an improvement in perceptual significance. The significance is used to compare the data pieces of the new item with the data pieces that are already stored. It can easily be understood that the data pieces produced by splitting the scalable bit-stream have the property of decreasing significance, since the scalable coding methods first product the most significant bits. The data pieces of a new item are then compared with the data pieces already present in the memory. When the new data pieces have a higher significance, previously stored data pieces are overwritten.

Although a scalable coding method is preferred, also a hierarchical coding method may be used.

The invention makes it feasible to store a variable number of data items in a fixed storage space. These data items are preferably multi-media objects, comprising audio objects, video objects, graphic objects etc. The data items are always stored with an optimum quality for a given amount of stored information. When an additional data item has to be stored, the amount of occupied storage of the already stored data item(s) is reduced (resulting in a quality reduction) enough to fit in the new data item, such that all data items will be stored at approximately the same quality.

Although in a preferred embodiment of the invention all memory parts have the same size, that is not required. The size of memory parts is chosen such that the storage capacity of multiple memory parts is usually required to store a single data item at a high quality. For example, a number of 8 storage data pieces is practical for storing an image.

In a preferred embodiment of the invention, a user is offered the possibility to store certain data items at higher quality than other data items.

These and other aspects of the invention will be apparent from the elucidated with reference to the accompanying drawings.

DETAILED DESCRIPTION OF THE PREFERRED EMBODIMENTS

The drawings only show those elements that are necessary to understand the invention.

Figure 1:
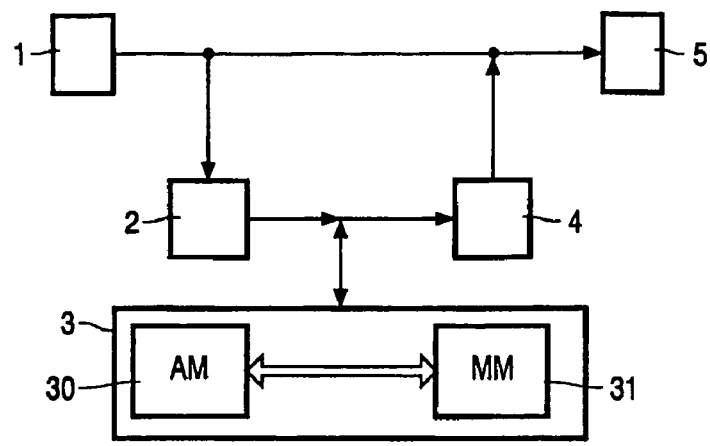
FIG. 1 shows a schematic diagram of an arrangement wherein data items are stored according to the invention.

FIG. 1 shows an arrangement according to the invention, comprising an input unit 1, a scaleable coder 2, a memory 3, a scaleable decoder 4 and on output unit 5. The input unit 1 may be of any kind to obtain data, e.g. an antenna, a camera or a storage medium. The data may be directly furnished to the output unit 5. The output unit 5 may be any kind of output unit, e.g. an antenna, a display or a storage medium. Before the data is furnished to the memory 3, the scaleable coder 2 processes the data to obtain scaleable bit-streams. The scaleable bit-streams are then furnished to the memory 3. For retrieving data from the memory 3, a scaleable decoder 4 is present which furnishes decoded data to the output unit 5 when desired. The memory 3 comprises an auxiliary memory (AM) 30 and a main memory (MM) 31. If necessary, some control or processing unit may be included in the memory 3 to control data flows.

Figure 2:
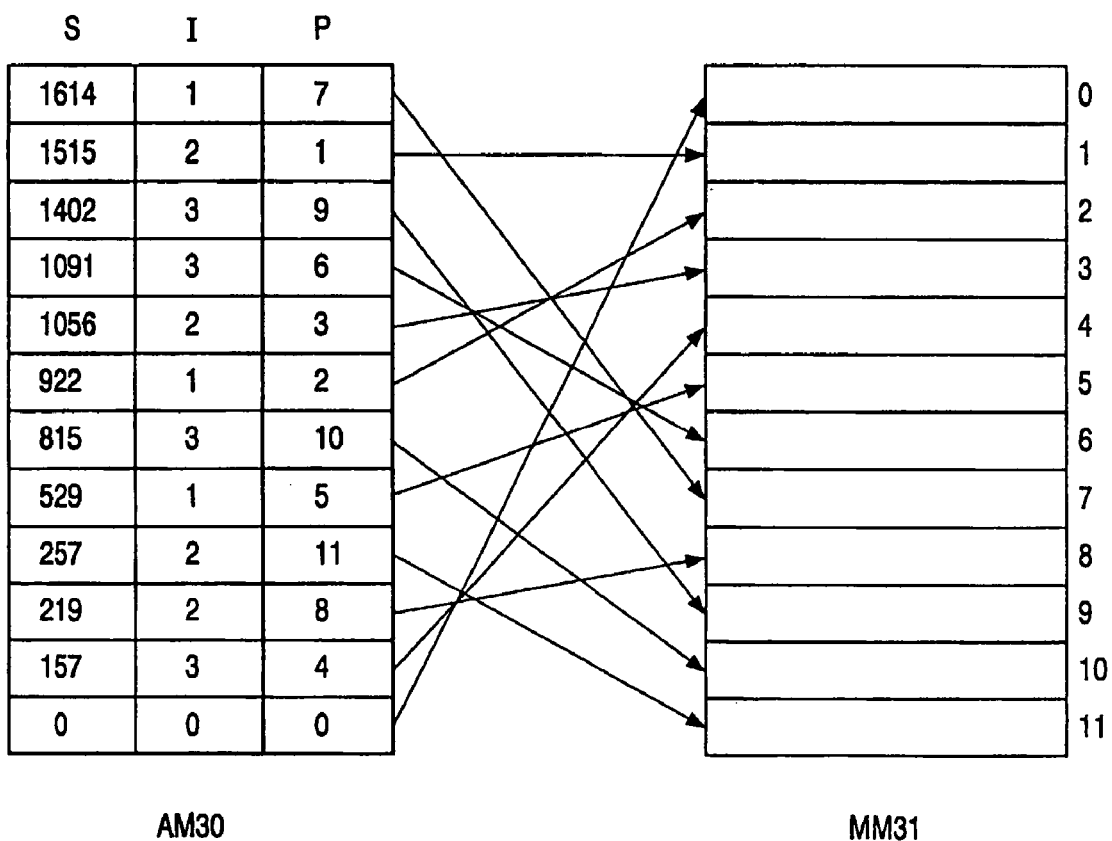
FIG. 2 shows a more detailed diagram of a part of the arrangement as shown in FIG. 1.

In FIG. 2, the auxiliary memory 30 and the main memory 31 are shown in more detail, with an exemplary content. The main memory 31 is divided into N memory parts for storing N data pieces. In this example N=11. The auxiliary memory is typically smaller than the main memory and is used for administrative purposes. The auxiliary memory comprises N records, each record comprising several fields. A first field is a Pointer to Main Memory (P), which comprises a pointer to a location in the main memory 31 that holds the data associated with a given record. A second field is an Object Identifier (I) that comprises information describing the data item to which the data piece stored in the main memory belongs. The object identifier refers to, for example, an image out of a set of images stored by a digital camera. In a practical embodiment the object identifier is zero in case a memory part is not assigned to a data item, e.g. when the memory part is empty. A third field comprises a Significance (S). The S filed gives a measure of the significance of the data piece stored in the main memory 31 to which the record refers to. The entries in the significance fields are preferably non-negative numbers. The auxiliary memory 30 preferably has the property that the records are sorted on the significance. It is also possible to sort the records in a different manner, e.g. on the identifier to group all data pieces belonging to the same data item. Within the respective group of data pieces, the data pieces may be sorted on significance.

To add a data item, the data item is coded in coder 2 to produce a scaleable bit-stream, which is split in to data pieces. The pieces are subsequently processed. The significance measure of each piece is first compared to that of the block (piece) with the lowest significance measure currently in the memory. If the significance of the new data piece is lower, it is not stored in the main memory, i.e. it is discarded. When a first piece is not stored, the processing can be stopped because the further data pieces have lower significance than the current data piece (which is a property of a scaleable coding mechanism). If the significance is higher, the new data piece is written to the main memory 31 at the position of the current least significant data piece (which is obtained from the last position of the auxiliary memory in case the records are sorted on significance). Thereafter, the last record of the auxiliary memory is replaced by the records data for the new data piece and the records in the auxiliary memory 30 are re-ordered to restore the ordering on significance. It is advantageous to start processing with the most significant data piece of an item (and then with the subsequent data pieces having lower significance), because this is the order in which the data pieces are produced by the scaleable coder 2, and further because these data pieces are not overwritten by blocks belonging to the same item since these are less significant.

To extract a data item, the records in the auxiliary memory 30 are subsequently processed and if the object identifier matches that of the data item to be extracted, the data piece in the main memory 31 pointed to by the record is sent to the scaleable decoder 4. Since the auxiliary memory is traversed starting at the highest significance, the data pieces will be extracted in the right order, allowing the decoder 4 to progressively form a better reconstruction.

To delete a data item, the records in the auxiliary memory 30 are subsequently processed and if the object identifier matches that of the data item to be deleted, the significance of the record is set to a (predetermined) values that is lower than any value that can be produced by the coder, e.g. zero. Preferably, also the identifier is set to a predetermined value, e.g. zero to indicate that the memory part is not assigned to a data piece. The records in the auxiliary memory 30 are then re-ordered to restore the ordering on significance, i.e. such that the records of the lowest significance are placed at the end.

The use of an auxiliary memory 30 is preferred. However, it is also possible to omit the auxiliary memory. In that case the significance of a data piece and an identifier to which data item it belongs should be stored in the main memory. Because pointers to data pieces in order of significance are in this case not available, searching the main memory 31 takes more time. To reduce searching, the data pieces may be sorted in the main memory, at the cost of switching much larger amounts of data. Also a Content Addressable Memory may be used to implement the auxiliary memory, eliminating the need for sorting and searching in the auxiliary memory by a separate processor. Furthermore, more advanced data structures such as heaps or trees, which are generally known, may be used for performing the administrative functions, as an alternative to the preferred auxiliary memory data structure. These alternatives could be advantageous for example in a software implementation (or hardware when sufficient clock cycles are available), especially for a large number of memory parts.

In a preferred embodiment of the invention, some additional information is stored for each data item. The additional information may include name, type of information, color, size, etc. This additional information may be stored in the main memory, e.g. together with the first data piece. Preferably, the additional information is stored in the auxiliary memory, which makes it easier to retrieve this additional information.

According to rate-distortion theory, as well as to scaleable coding practice, one first has to send/store those bits that have the largest impact on reducing the distortion in the reproduction made by the decoder. The distortion measure that is used, depends on the application; e.g. one would typically use different measures for video and audio. However, all these distortion measures have in common that they correspond in some way to the quality of the video/audio object as perceived by the consumer during the reproduction. Our definition of this measure is independent of the particular application.

The computation of a significance value of the present application is discussed with reference to the method of calculation contained in non pre-published European Patent Application 00200890.2 (Our reference PHNL000110). This method was designed to optimize the overall rate-distortion performance of the storage, i.e. to guarantee the lowest overall distortion of the stored media items. The method used a differential distortion measure associated with individual data pieces of a data item. In particular, the significance was computed by the encoder, and was formally defined as:

$$S_{i,k} = \frac{D_{i,k-1} - D_{i,k}}{R_{i,k} - R_{i,k-1}} \quad (1)$$

where the index i refers to a given object and the index k indicates the number of encoded blocks that are available at the decoder. $D_{i,\,k-1}$ thus represents a distortion in the reproduction when k−1 subsequent blocks have been received and $D_{i,\,k}$ represents the distortion in the reproduction after k blocks have been received. $R_{i,\,k-1}$ represents a rate, i.e. the total number of bits used, for k−1 subsequent blocks and $R_{i,\,k}$ represents the number of bits used for k blocks. $D_{i,\,0}$ is the initial distortion at the decoder when no bits have been transmitted and $R_{i,\,0}$ is the number of bits when no bits have been sent, i.e. $R_{i,\,0}=0$. When all blocks in the main memory have the same size, division by block size is a constant division and is preferably left out:

$$S_{i,k}=D_{i,k-1}-D_{i,k} \quad (2)$$

Thus the significance value represents the reduction in distortion achieved by adding a $k^{th}$ block. This method of calculation of significance maximizes the overall rate-distortion performance of the storage medium to guarantee the lowest overall total distortion of the stored data items.

An embodiment of the present invention uses an alternative computation method for significance, in which the significance value for each block is based on or representative of the total or absolute distortion of a media item after decoding all of the data blocks up to and including the current data block. Thus given any distortion measure that can be computed by the encoder, the significance may be formally defined as:

$$S_{i,k}=D_{i,k} \quad (3)$$

where the index i refers to a given object and the index k indicates the number of encoded blocks that are available at the decoder. $D_{i,\,k}$ thus represents a distortion in the reproduction when k subsequent blocks have been received and $D_{i,\,0}$ is the initial distortion at the decoder when no bits have been transmitted.

An advantageous embodiment of the invention, which maximizes the minimum item quality, concerns a simple modification of the block significance values. The minimum image quality is important, next to the average quality, since it gives the user a guaranteed quality for each individual image. Furthermore, the overall image quality impression/satisfaction is often determined by the lowest-quality image, since artefacts will be first or most visible in this particular image. Instead of always reducing the quality of the media item that currently has the highest quality, a "look-ahead" of one quality reduction step is employed: at each time the media item will be reduced in quality that has the highest remaining quality after the next data block is removed from it. By taking into account the quality loss caused by removing the next data block, this embodiment allows better control of the individual item quality and guarantees the highest minimum item quality. Basically, the significance value for each block is the resulting absolute distortion of the media item when that block is removed. All operations on the memory remain unchanged. In this embodiment the significance can be defined as:

$$S_{i,k}=D_{i,k-1} \quad (4)$$

Although no further modifications are required for implementing the new strategy, this implementation does not allow to directly obtain the actual quality for each item, since computing the quality requires the significance value of the "next" block for each item, but these blocks have either already been overwritten or don't even exist in case the item is completely stored. In fact, compared to the distortion values used by the strategy of the previous embodiment, the current significance values have been "shifted down" one position to the next block; therefore, at the end of the chain the last distortion value is missing. To solve this issue (which is required at least for research purposes, e.g. to produce the PSNR values), it would thus suffice to store and update during the memory operations the "last" distortion value for each item. Alternatively, instead of making these modifications to the memory operations, one can also store the additional "missing" distortion value for each block. This approach is somewhat less efficient in terms of memory usage (although the additionally required memory is negligible compared to the actual compressed data memory), but can be implemented with minor modifications of the available software. Therefore, this approach was taken in our implementation.

Another approach is the use of the total or absolute distortion of the data item up to and including said data piece in accordance with equation (3) and to check not the significance $S_{i,k}=D_{i,k}$ of the current data piece to be removed, but the significance $S_{i,k-1}=D_{i,k-1}$ of the next data piece (the piece with the lowest distortion but one) of the same data item in order to determine the quality of the data item after removal of the data piece with the lowest absolute distortion (the least significant block of the given data item). In this approach, the actual quality of each item remains available.

An example of a distortion measure, which is often used in images/video, is the quadratic error measure, which is the sum of the squared pixel value differences between an original image and its reproduction. This quadratic error measure may be used as a distortion measure in the present invention. After encoding block k, the encoder, in principle, has to recompute the error for each pixel of the image in order to obtain $D_k$, but in practice some simplifications/shortcuts of this computation are usually possible.

In a practical embodiment, a number is added to the significance of a first data piece of each data item number after reception to make sure that the first data piece of each data item can normally not be overwritten. This has the advantage that for each data item, one data piece normally always remains in the memory, which makes it possible to make a rough representation of the data item, such as a 'thumb-nail' image. For example, to prevent the first block of an item to be overwritten, its significance is set to "infinite", i.e. a constant value larger than any distortion value that can occur for the other blocks in the memory. In a practical embodiment, the value of $2^{31}$ is used for the constant and the distortion values are the absolute squared errors. The constant $2^{31}$ is sufficiently large for images of dimensions 768×512 pixels, but should be increased for larger image dimensions (e.g. to $2^{39}$ or $2^{47}$). Instead of increasing the constant, one could also scale down the distortion values (by dividing them by another constant value, e.g. $2^8$ or $2^{16}$).

In EP00200890.2, a difficulty arose if the sequence of data pieces of a scalably coded data item, did not have a strictly decreasing distortion difference. In practice it required a processing of the block significance values to ensure that the blocks occurring later in the bit string always had a lower distortion reduction than the earlier blocks (i.e. to ensure a convex practical rate-distortion curve). This convexity constraint is not required for the present invention, since it only requires that the total media item distortion decreases for each additional block in a sequence.

In an optional embodiment, a combination of the method of the present invention and that of EP00200890.2 is provided in which the significance value is a weighted sum of the distortion difference value of EP00200890.2 (described above) and the total or absolute distortion value of the present application.

It is possible to jointly store different types of objects, e.g. both audio and video, in the memory, using appropriately weighted perceptual significance measures and/or appropriately selected block sizes.

Advantageous use of the invention is made in applications using a device of fixed storage capacity for storing compressible data, such as video, images, audio, speech, etc. In which an unknown/variable amount of data has to be stored and/or for which substantially equal quality is maintained between data items, whilst attempting to ensure that data items have the highest possible data quality at all times.

Examples of Advantageous Embodiments are:

Digital Still Camera. A first picture may be stored at very high quality. Subsequent pictures are stored in the fixed memory, while replacing some of the data of the previous pictures. Depending on the total number of pictures in the memory, a certain quality of the pictures is achieved. The more pictures, the lower the average quality. In a doorbell application, a picture may be taken every time someone pushes a button of a doorbell.

Answering Machine/Voice Mail. An audio data item is stored for each person that calls and leaves a message. In case the memory is completely used, new audio items may be stored by reducing the quality of the already stored audio items.

Video Recorder. A new feature offered in a video recorder is, e.g., variable recording time. One application thereof is the ability to store more relevant programs in a lower quality instead of not recording a program because a storage capacity of a tape or disc is entirely used.

Picture-In-Picture (PIP) Replay. A user indicates the duration of a PIP Replay of a certain program, e.g. by pressing a button while watching TV. Because a give PIP-memory has a fixed capacity, the user may exchange quality and duration of the PIP Replay.

Buffer control for embedded image memory. The whole image is subdivided into parts that are individually coded using a scaleable coding technique. The individual parts are then split up into blocks and put into the main memory. The advantage of this new approach is that a smaller memory is required for the same image quality or a better image quality is obtained for the same memory size. [The traditional approach is to first encode (and store) the whole image, before combining the individual parts. Alternatively, a fixed number of bits is assigned to each part of the image, but this is a sub-optimal approach.]

All these embodiments are preferably provided with some kind of quality indicator to the user.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. This word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

In summary, storing of data items in a memory is provided wherein the data items are divided into successive data pieces of decreasing significance, and the data pieces are stored in respective parts of the memory, and when applying a data piece to the memory in case all candidate memory parts are assigned to other data pieces: if the significance of the applied data piece is lower than the lowest significance of the other data pieces, discarding the applied data piece; if the significance of the applied data piece is higher than the lowest significance, storing the applied data piece in one of the candidate memory parts at expense of a given other data piece which has a lower significance that the significance of the applied data piece. Preferably for each data piece a record is kept comprising a significance of the data piece and the data item to which the data piece belongs. The data items are preferably coded by a scaleable coding mechanism. The scaleable bit-stream is cut into data pieces of the same sizes as those available in the memory. Next, for each of these smaller pieces, a significance value is calculated. The significance value is calculated as a total or absolute distortion value representing the total distortion for the successive blocks of a data item up to and/or including the current block. The significance is used to compare the data pieces of the new item with the data pieces that are already stored. It can easily be understood that the data pieces produced by splitting the scaleable bit-stream have the property of decreasing significance, since the scaleable coding methods first produce the most significant bits. The data pieces of a new item are then compared to the data pieces already present in the memory. When the new data pieces have a higher significance, previously stored data pieces are overwritten. Advantageous use of the invention is made in applications using a device of fixed storage capacity for storing a flexible number of compressible data items, such as video, images, audio, speech.

The invention claimed is:

1. A method of storing data items in a memory, the method comprising the steps of:

dividing each data item into successive data pieces of decreasing significance;

storing the data pieces in respective parts of the memory; and when applying a data piece to the memory in case all candidate memory parts are assigned to other data pieces;

if the significance of the applied data piece is lower than the lowest significance of the other data pieces, discarding the applied data piece; and if the significance of the applied data piece is higher than the lowest significance of the other data pieces, storing the applied data piece in one of the candidate memory parts at expense of a given other data piece which has a lower significance than the significance of the applied data piece, wherein the significance of each data piece is based on a total or absolute distortion of the data item at that data piece.

2. The method as claimed in claim 1, wherein the total or absolute distortion is the total or absolute distortion of the data item up to and including that data piece.

3. The method as claimed in claim 1, wherein the total or absolute distortion is the total or absolute distortion of the data item up to but not including that data piece.

4. The method as claimed in claim 1, wherein for each data piece a record is kept, comprising the significance of the data piece and the data item to which the data piece belongs.

5. The method as claimed in claim 4, wherein the data items are stored in a main memory and the record is kept in an auxiliary memory, each record further comprising a pointer which indicates a position in the main memory in which a given data piece is stored.

6. The method as claimed in claim 1, wherein the significance of each data piece comprises the weighted summation of a distortion difference value for the data piece and the total distortion of the data item at that data piece.

7. The method as claimed in claim 1, wherein the significance of the first data piece of each data item is increased.

8. A method of reading data items from a memory, which data items have been divided into successive data pieces of decreasing significance, which data pieces have been stored in respective memory parts, wherein an indication of the significance of each data piece is available in the memory, the method comprising the steps of:

reading for each data item the successive data pieces from the memory, which data pieces belong to said data item; and constructing the data item from the successive data pieces, wherein the significance value of each data piece is based on a total or absolute distortion of the data item at that data piece.

9. An arrangement for storing data items in a memory, the arrangement comprising:

means for dividing each data item into successive data pieces of decreasing significance;

means for storing the data pieces in respective parts of the memory; and means for applying a data piece to the memory, which means are arranged for, in case all candidate memory parts are assigned to other data pieces, discarding the applied data piece if the significance of the applied data piece is lower than the lowest significance of the other data pieces; or storing the applied data piece in one of the candidate memory parts at expense of a given other data piece that has a lower significance that the significance of the applied data piece if the significance of the applied data piece is higher than the lowest significance of the other data pieces, wherein the significance of each data piece is based on an total or absolute distortion of the data item at that data piece.

10. An arrangement for reading data items from a memory, which data items have been divided into successive data pieces of decreasing significance, which data pieces have been stored in respective memory parts, wherein an indication of the significance of each data piece is available in the memory, the arrangement comprising:

means for reading for each data item the successive data pieces from the memory, which data pieces belong to said data item; and means for constructing the data item from the successive data pieces, wherein the significance value of each data piece is based on a total or absolute distortion of the data item at that data piece.

11. A storage medium having stored thereon data items, which data items have been divided into successive data pieces of decreasing significance, which data pieces have been stored in respective memory parts, where an indication of the significance of each data piece is available on the storage medium, and wherein the indication of significance, wherein the significance of each data piece is based on a total or absolute distortion of the data item at that data piece.

* * * * *